Feb. 21, 1961 F. ATZBERGER 2,972,192
BRAKE GAUGE
Original Filed April 15, 1953

INVENTOR
FRANK ATZBERGER
BY *Ernest G Montague*
ATTORNEY

United States Patent Office 2,972,192
Patented Feb. 21, 1961

2,972,192

BRAKE GAUGE

Frank Atzberger, 160—14 Normal Road, Jamaica, N.Y.

Substituted for abandoned application Ser. No. 348,998, Apr. 15, 1953. This application Apr. 24, 1959, Ser. No. 808,734

2 Claims. (Cl. 33—180)

The present invention relates to a gauge for use in adjusting automobile brake shoes to fit the brake drums with the proper clearance there around.

This is a re-file application of the application Serial No. 348,998, filed April 15, 1953, and abandoned.

Automobile brakes are, for the most part, of the internal expanding shoe type wherein a plurality of arcuate brake shoes are normally held in inactive position closely spaced within the internal cylindrical brake surface of a brake drum attached to the wheel of the vehicle. Braking effect is achieved upon the brake drum by a brake operating mechanism which is effective to force the brake shoe into frictional engagement with the braking surface of the drum. In order to keep the braking system in proper operating condition, it is necessary to maintain definite clearance between the frictional surfaces of the linings on the brake shoes and the braking surfaces of the drum, which clearances should not vary in the life of the vehicle. Since, however, both the brake linings and the drums are subject to wear in normal usage, it becomes necessary to provide adjusting mechanism to move the brake shoes outwardly from time to time as the clearance increases due to such wear. When the linings become worn thin after repeated adjustment, they are replaced by new linings, which require again adjusting of the brake shoes inwardly to provide sufficient space for the increased thickness of the new lining within the brake drum. Also, it may be necessary, on the other hand, after long periods of use, to turn down the brake drum at a lathe or other suitable machine to restore the inner surface of the brake drum to a true, smooth, cylindrical shape. This reshaping of the inner surface becomes particularly necessary since the long time wear of the brake shoes on the inner surface of the brake drum brings about bellmouth wear, the degree of which cannot be easily determined. Thus, when the linings are repaced, or when the drum is worked down to a slightly larger inside diameter, it becomes even more important to obtain an accurate adjustment of the brake shoes, so that they will fit and operate properly under the new conditions.

Since no convenient and accurate gauge instruments have been available, brakes have been adjusted usually by a trial and error procedure, in which the various adjustments are tightened to expand the brake shoes into contact with the inner face of the drum all around, and then loosening until the wheel can be turned by hand. Such procedure will usually put the brakes in operating condition, and when practiced by an experienced mechanic, will produce the proper feel in the brake pedal. Such trial and error adjustment is, however, very likely to produce uneven wear of the brake lining, first of all, because the degree of bellmouth wear could not be exactly established and also due to lack of proper co-ordination between the heel and toe adjustments in the individual shoes.

In order to meet this recognized problem, gauges of rather complicated structure have been proposed which required sliding parts and involved sliding scales or indexes without rendering such fine measurements necessary for proper adjustment of the brakes.

It is, therefore, one object of the present invention to provide a brake gauge which permits of easy determination up to thousandths of an inch on the inner surface of the brake drum without any particular scale.

It is another object of the present invention to provide a brake gauge which comprises an eccentric dial shaft properly supported in an adapter to be positioned diametrically in the brake drum and which dial shaft is designed in such manner that it permits exact reading on the dial the drum diameter and any bellmouth wear on the brake drum.

It is still another object of the present invention to provide a brake gauge which permits all the setting of the anchors of the brake shoes in order to assure an exact concentric position of the brake shoes.

With these and other objects in view, which will become apparent in the following detailed description, the present invention will be clearly understood in connection with the accompanying drawings, in which.

Figure 1:
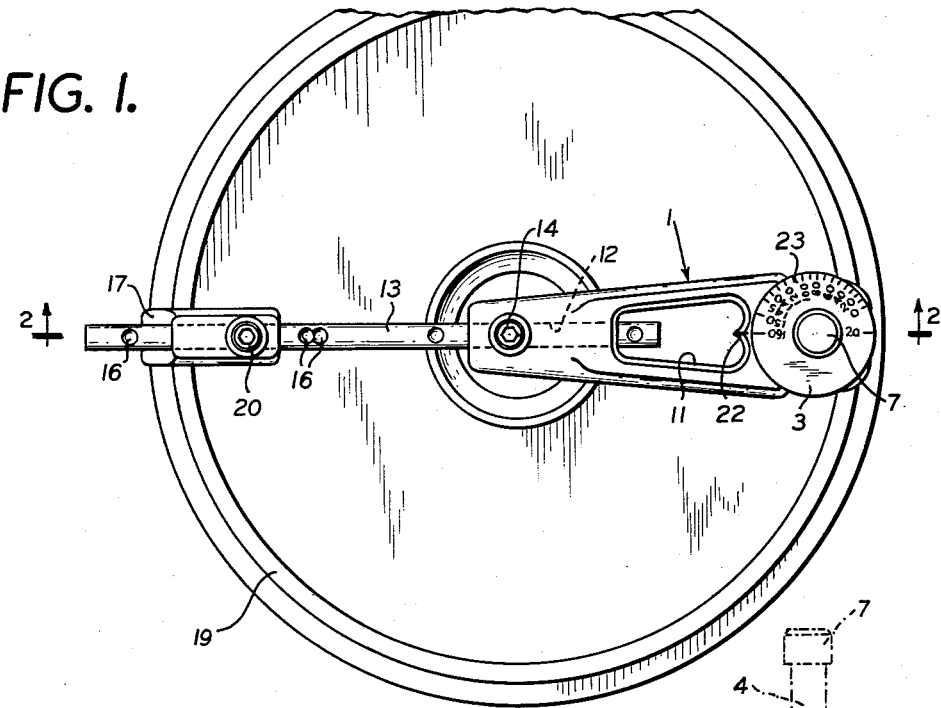
Figure 1 is a front elevation of a gauge mounted on a brake drum.
Figure 2:
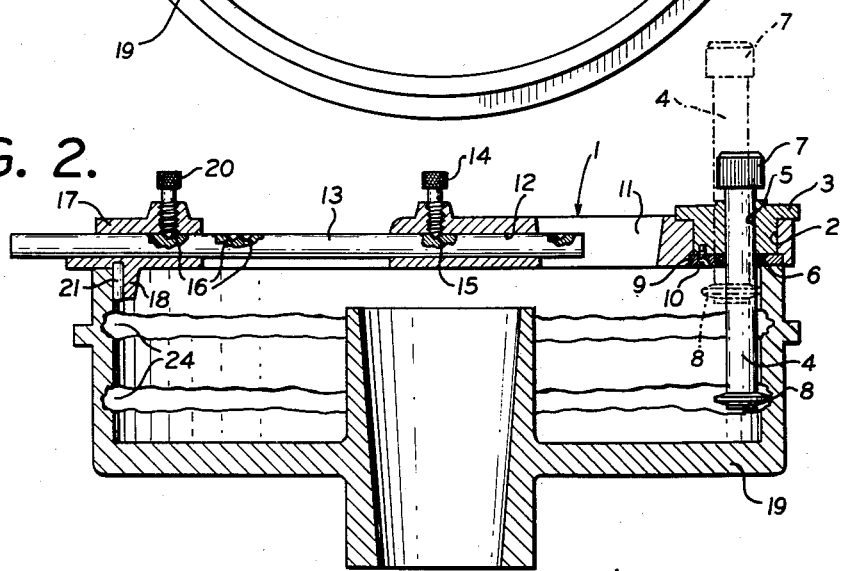
Fig. 2 is an axial section along the lines 2—2 of Fig. 1.
Figure 3:
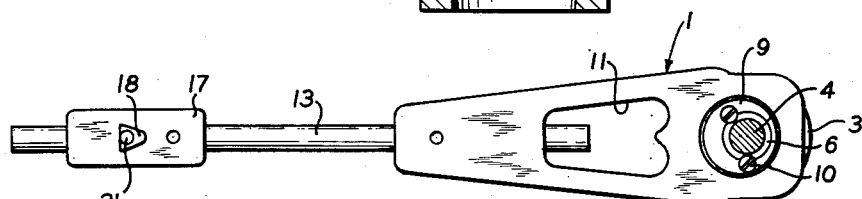
Fig. 3 is a top plan view of the gauge.

Referring now to the drawings, and particularly to Figs. 1 to 3, the gauge comprises a rigid longitudinal arm 1, which has close to one end thereof a cylindrical opening 2 which is adapted to receive a dial disc 3, preferably set off at its top portion in order to provide an enlarged area for the dial markings. The top face of the dial disc 3 is equipped with a number of markings for reading of thousandths of an inch of diameter differences in the brake drum.

A shaft 4 is disposed eccentrically in a proper boring 5 of the dial disc 3 and any suitable means may be provided to connect the shaft 4 for common rotation with the dial disc 3.

Fig. 2 shows by example a split ring 6, which due to its resilient effect operates as means disposed between the dial disc 3 and the shaft 4 to provide friction, and thereby to slow up the axle sliding of the shaft 4 relative to the dial disc 3. The lower end of the shaft 4 may be positioned at any predetermined distance from the dial disc 3. The outer end of the shaft 4 carries a knurled head 7, while its inner end has mounted thereon a sliding measuring disc 8 at least of a hardened surface and of predetermined diameter which is larger than that of the shaft 4. In order to retain the dial disc 3 in its position mounted thereon, a counter-plate 9 may be provided flush with the inner face of the arm 1, which counter-plate 9 is secured by two screws 10 or by other means to the inner face of the dial disc 3.

The arm 1 has a recess 11 and has at its end opposite that of the dial disc 3, a longitudinal bore 12 which is adapted to receive a rod 13, which may be secured to the arm 1 by means of a set screw 14. A slight recess 15 provided in the rod 13 permits slight penetration of the set screw 14 into the rod 13.

As particularly clearly shown in Fig. 1, the rod 13 is equipped with a plurality of small end bores 16 for a purpose to be described below.

An abutment piece 17 is mounted on the other end of the rod 13 for axial sliding thereon, to assume any one of a plurality of selected positions on said rod 13. It is preferred to provide the above-mentioned small bores at such distances from the recess 15, that the distance between the recess 15 and each one of the additional small bores 16 is complementary to the respective diameters of brake drums in different car models. The abutment piece 17 has a downwardly extending projection 18 which operates as abutment member against the inner cylindrical face of the brake drum 19. A set screw 20 retains the abutment piece 17 in proper position. The projection 18 has an insert 21 which is of hardened steel. Thus, the measuring disc 8 and the insert 21 are equipped with a hard surface, or may be made entirely of hardened steel in order to maintain the correct measurements of the gauge. Since the shaft 4 is turned due to its eccentric position in the dial disc 3, in order to determine any bellmouth wear, it is quite clear that different portions of its periphery will engage the inner face of the different brake drums and thus will not bring about wear on any particular point of its periphery.

The top face of the dial disc 3 is equipped with a scale, which preferably carries indicia from —.020 of an inch through +.160 of an inch, though it is clear that any other indicia arrangement may be provided for indication of the clearance distance in the brake drum. The small bores 16 which are disposed along the longitudinal axis of the rod 13 at predetermined distances, are set in such a manner that upon setting the dial disc 3 to zero position by turning the dial disc 3 until the zero index coincides with the mark 22 on the top face of the arm 1 adjacent the dial disc 3, the distance between the extreme peripheral point of the measuring disc 8 and the extreme peripheral point of the projection 18 amounts to 8 inches, 10 inches, 12 inches, and so forth, in accordance with the clearances of conventional brake drums.

It is apparent that when the dial disc 3 is rotated about its longitudinal axis, the peripheral surface of the shaft 4 and of the measuring disc 8 will move to slightly different diametrical distances from the peripheral surface of the projection 18, and that the different radial distances thus measured by the measuring disc 8 may be designated by the indicia on the scale 23 in terms of thousandths of an inch clearance within any brake drum of standard size.

If the clearance of a particular brake drum is to be determined, it is merely necessary to loosen the set screw 20 of the abutment piece 17 and to move the latter along the rod 13 to a position opposite the corresponding small bore 16 which is set corresponding with the known diameter of the brake drum and the adapter arm 1 is then inserted into the drum 19 by engaging the abutment piece 17 on one side of its inner face and the measuring disc 8, upon setting the dial disc to its zero position, on the diametrically opposite side of its inner face. In case the clearance of the brake drum is undersized, it may be necessary to set the dial into a minus position, for which purpose the dial permits to go up to —.020. If the inner face of the brake drum 19 shows, however, bellmouth wear, as indicated at 24, the shaft 4 is pushed slowly into the brake drum 19, at the same time turning the dial disc 3, so that the measuring disc 8 is in constant engagement with the inner face of the brake drum 19. During the engagement of the measuring disc 8 with the straight cylindrical portion of the inner surface of the brake drum, the shaft 4 will just move inwardly without permitting any further rotation of the dial disc 3. Upon reaching, however, a worn bellmouth portion 24 of the inner face of the brake drum 19, the dial disc 3 will permit of rotation together with the shaft 4 until the measuring disc 8 engages the worn portion of the inner surface of the brake drum. 19. Such increase of the clearance may now readily be determined on the scale 23. This reading must be doubled, however, since the scored portion has been measured on one side only. For example, if the first reading was zero, and the shaft 4 has been lowered to the worn portion, and the second reading was .030 on the dial, the difference amounts to .030 which must be doubled to .060. This reading indicates that the drum must be cleared to .060 when turned on the lathe in order to remove the bellmouth wear and provide again a clear cylindrical inner surface of the brake drum.

The prior determination of the clearance of the brake drum, as for instance given by the example stated above with an overclearance of .060 inch will require that the brake shoe must be positioned at .030 inch outside of its normal position.

While I have disclosed one embodiment of the present invention, it is to be understood that this embodiment is given by example only and not in a limiting sense, the scope of the present invention being determined by the objects and the claims.

I claim:

1. A brake gauge for a brake drum comprising a longitudinal arm, a dial disc rotatably mounted in said arm about an axis perpendicular to the longitudinal axis of said arm, a gauging element eccentrically mounted on said dial disc for rotary and axial movement relative therto toward and from a predetermined zero position, said eccentric gauging element comprising a shaft having at one of its ends a measuring disc of a diameter greater than that of said shaft, said measuring disc having its peripheral surface farthest removed from the axis of said brake drum adapted to engage the braking surface of said brake drum, an abutment piece engaging the braking surface of said brake drum at a point diametrically opposed to the drum engaging surface of said gauging element, and a connecting rod adjustably secured to said longitudinal arm and to said abutment piece, said measuring disc being adapted to indicate on said dial disc the correct size of said brake drum, as well as any bellmouth portion on its braking surface, upon lowering said shaft and simultaneous turning of said dial disc.

2. The brake gauge, as set forth in claim 1, in which said rod has a plurality of small bores spaced apart along the longitudinal axis of said rod, and a set screw, each of said small bores being adapted to receive said set screw, the distance between the farthest removed peripheral surface of said measuring disc and the farthest removed peripheral surface of said abutment piece corresponding with the respective brake drum sizes in the respective positions of said abutment piece on said rod.

References Cited in the file of this patent

UNITED STATES PATENTS

| | | |
|---|---|---|
| 642,750 | Nielsen | Feb. 6, 1900 |
| 677,574 | Huestis | July 2, 1901 |
| 2,124,603 | Barrett | July 26, 1938 |
| 2,268,354 | Thomason | Dec. 30, 1941 |
| 2,553,525 | Burke | May 15, 1951 |
| 2,614,333 | Peters | Oct. 21, 1952 |
| 2,648,134 | Billeter | Aug. 11, 1953 |
| 2,693,033 | Acker | Nov. 2, 1954 |
| 2,769,241 | Barrett | Nov. 6, 1956 |

FOREIGN PATENTS

| | | |
|---|---|---|
| 556,532 | Great Britain | Oct. 8, 1943 |